United States Patent [19]
Lewandowski et al.

[11] Patent Number: 5,878,892
[45] Date of Patent: Mar. 9, 1999

[54] SEPARATING DEVICE FOR PRECIPITATING SOLID PARTICLES FROM THE GAS FLOW OF A FLUIDIZED BED

[75] Inventors: Wladyslaw Lewandowski, Obersasbach; Henrik Schirner, Erlangen; Frank Steege, Röthenbach; Axel Schulle, Neuhaus a.d. Pegn., all of Germany

[73] Assignee: ABB Patent GmbH, Mannheim, Germany

[21] Appl. No.: 946,716

[22] Filed: Oct. 8, 1997

Related U.S. Application Data

[63] Continuation of PCT/EP97/00464 Feb. 3, 1997.
[51] Int. Cl.⁶ ........................................ B07B 4/00
[52] U.S. Cl. .................. 209/139.1; 209/141; 209/142; 209/143
[58] Field of Search .............................. 209/139.1, 139.2, 209/140, 141, 142, 143; 110/216; 55/434, 454, 461, 459.1

[56] References Cited

U.S. PATENT DOCUMENTS

| | | | |
|---|---|---|---|
| 3,775,948 | 12/1973 | Beam | 209/139.1 X |
| 4,946,653 | 8/1990 | Stopp et al. | 209/140 X |
| 5,526,938 | 6/1996 | Kraft et al. | 209/139.1 |

*Primary Examiner*—David H. Bollinger
*Attorney, Agent, or Firm*—Herbert L. Lerner; Laurence A. Greenberg

[57] ABSTRACT

A separating device precipitates solid particles from a gas flow of a circulating fluidized-bed or CFB reactor, wherein the particles are carried along in the gas flow. A device is provided which influences the gas flow in such a way that centrifugal and gravitational forces that are greater than entraining forces of the gas flow act on the solid particles and thus permit particles of a specific minimum size to be separated from the gas flow. A particularly compact construction of a CFB system is achieved when the gas flow emerging from the CFB reactor reaches a flow channel which directs it from top to bottom along a circular arc around a horizontally disposed cyclone axis. The gas flow is fed from there to a take-over channel suitable for passing it on. The flow channel merges in a vertical direction and correspondingly expands downward into a separating chamber in which the precipitated solid particles sink down to a floor.

16 Claims, 3 Drawing Sheets

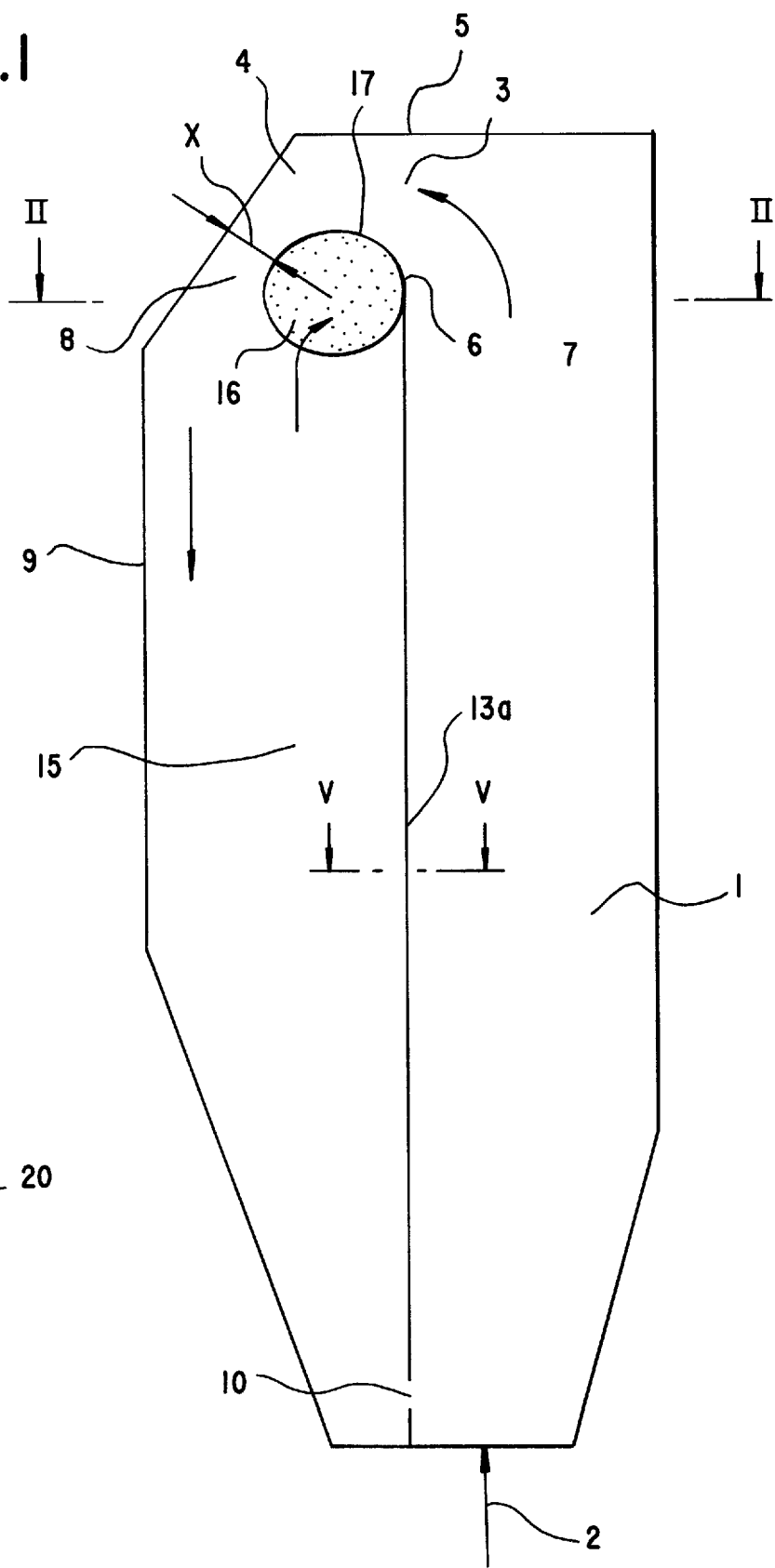
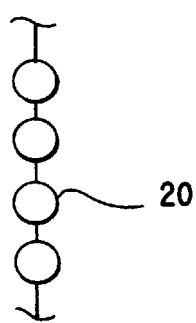

SEPARATING DEVICE FOR PRECIPITATING SOLID PARTICLES FROM THE GAS FLOW OF A FLUIDIZED BED

CROSS-REFERENCE TO RELATED APPLICATION

This application is a continuation of International Application Serial No. PCT/EP97/00464 filed Feb. 3, 1997.

BACKGROUND OF THE INVENTION

Field of the Invention

The invention relates to a separating device for precipitating solid particles from a gas flow of a combustion chamber or circulating fluidized-bed or CFB reactor, wherein the gas flow carries the particles along and a device influences the gas flow in such a way that centrifugal and gravitational forces which are greater than entraining forces of the gas flow act on the solid particles and thus permit particles of a specific minimum size to be separated from the gas flow.

A CFB system operates by using a circulating fluidized-bed reactor. In that case, primary air flows from bottom to top through a mass composed of fine-grained, solid particles which are fed to a combustion chamber. When the fluidized bed is formed, a force due to the weight of the solid particles is canceled by an opposing force of the gas flow.

A portion of the solid particles leaves the fluidized-bed reactor with the gas flow. The solid particles are removed from the gas flow by additional devices, in order to ensure a solids cycle which is required for the process.

It is known to use centrifugal-force precipitators referred to as cyclones to separate the solid particles from the exhaust gas flow. The principle of centrifugal-force precipitation is based on the action of centrifugal forces. Centrifugal forces which are produced by accelerating the gas/solids mixture onto a circular track around the vertical cyclone axis act with different strengths on the gas component and solids component of the gas flow. The centrifugal force increases with increasing particle size, with the result that the particles are precipitated starting from a specific grain size. Particles which are smaller than the so-called separating grain follow the gas flow. The solid particles which are larger than the separating grain of the cyclone are flung against its wall and slide downwards to a solids outlet. The gas flow and the solid particles which are smaller than the separating grain leave the cyclone through a central opening in the ceiling.

Particularly in the case of cyclones in which the gas flow is very heavily loaded with solids, the effect of the centrifugal-force precipitation is very strongly overlaid by mass precipitation, that is to say a large portion of the particles in the gas flow does not swell repeatedly around the vertical cyclone axis but, immediately after entering the cyclone, drops downwards to the solids outlet in the form of a downwardly directed solids tube. Only a relatively small portion of the solid particles is separated from the gas flow by centrifugal force precipitation.

Cyclones of conventional construction for CFB systems are very large, bulky structures which need to have large masses of masonry for the purpose of adequate thermal insulation and to provide protection against erosion by impacting solid particles. Those masses of masonry may only be heated up slowly, which results in long start-up times for CFB systems. Start-up and run-down operations reduce the service life of the outer masonry. Furthermore, expensive compensators are required in the conventional construction of cyclones because of differences in the magnitudes and directions of the thermal expansion for the cyclone, the combustion chamber and a boiler convection section.

SUMMARY OF THE INVENTION

It is accordingly an object of the invention to provide a separating device for precipitating solid particles from a gas flow of a fluidized bed, which overcomes the hereinafore-mentioned disadvantages of the heretofore-known methods and devices of this general type and which effects precipitation of the solid particles from an exhaust gas flow as close as possible to an outlet of a combustion chamber, and thereby permits a compact integration with the combustion chamber and with further functional units if appropriate.

With the foregoing and other objects in view there is provided, in accordance with the invention, a separating device for precipitating solid particles from a gas flow, comprising a circulating fluidized-bed reactor conducting a gas flow carrying solid particles with a given entraining force; and a device for influencing the gas flow to permit centrifugal and gravitational forces greater than the given entraining force to act on the solid particles and cause the solid particles of a specific minimum size to be separated from the gas flow, the device including a flow channel directing the gas flow emerging the reactor from top to bottom along a circular arc around a horizontally disposed cyclone axis; a take-over channel for receiving and passing on the gas flow from the flow channel; and a separating chamber into which the flow channel merges vertically and correspondingly expands downwardly for sinking precipitated solid particles down in the separating chamber.

Due to the construction of this flow channel with a horizontally extending cyclone axis, the solid particles pass along the shortest path to a point in the flow channel where the latter merges, expanding in the process, into the separating chamber, which therefore comes to lie directly next to the combustion chamber. This configuration permits a very compact construction, but at the same time a very effective separation of the solid particles from the exhaust gas flow is achieved, because the inlet point into the separating chamber operates as a diffusor. Gravitational and centrifugal forces acting on the heavy solid particles do not permit the latter to follow the exhaust gas flow on its arc, leading upwards, as far as the take-over channel, with the result that the particles slide downwards into the separating chamber.

In accordance with another feature of the invention, the flow channel tapers continuously up to the inlet into the separating chamber, in order to achieve a continuous acceleration of the gas flow. The gas flow is delayed and deflected at the inlet point to the separating chamber with its diffusor-like expansion of the flow channel, with the result that flow energy is recovered as pressure.

In accordance with a further feature of the invention, the deflection of the gas flow in the diffusor occurs in such a way that there is no back-mixing with solid particles that were already separated. It is effective to position the inlet into the take over channel at a sufficient distance from the outlet of the flow channel, with the aim being to cause the gas flow to also pass a turning point beyond which it goes upwards again.

In accordance with an added feature of the invention, whereas in conventional cyclones the solid particles repeatedly revolve around the vertical cyclone axis together with the gas flow, in the case of the present configuration it suffices that the circulation of the gas flow around the horizontally situated cyclone axis up to the inlet into the take-over channel describes a part of a circle which corresponds to a rotation of less than 360°.

In accordance with an additional feature of the invention, a space situated inside the circular arc is used for the purpose of aligning the take-over channel coaxially with the cyclone axis.

In accordance with yet another feature of the invention, there is provided a receiving opening in the take-over channel for the purpose of receiving the gas flow cleaned of the separated solid particles. A first alternative which is conceivable for this purpose is that the receiving opening extends parallel to the cyclone axis and faces the separating chamber at the bottom. According to a second alternative, the receiving opening extends vertically or at an angle relative to the cyclone axis.

In accordance with yet a further feature of the invention, the combustion chamber and the separating chamber are combined with one another in a basic reactor unit and a partition which is situated between them has an upper end that is adjoined by the take-over channel on the side of the separating chamber. This provides a particularly compact construction.

In accordance with yet an added feature of the invention, the flow channel is formed without additional internals, on one hand by the outer contour of the takeover channel and, on the other hand, by the inside of the outer wall of the basic reactor unit. This simplifies the configuration of the flow channel.

In accordance with yet an additional feature of the invention, the gas flow in the flow channel reaches its highest speed at its narrowest point before the inlet into the separating chamber. A speed of 10 to 60 m/s is particularly favorable for separating the particles.

In accordance with again another feature of the invention, the configuration of the take-over channel directly downstream of the outlet of the combustion chamber permits not only a compact integration between the latter and the separating chamber, but also permits the convection section to be directly connected.

In accordance with again a further feature of the invention, as a result, it is then possible to integrate the convection section into the basic reactor unit including the separating chamber and the combustion chamber, as a result of which a further partition comes to be situated between the separating chamber and the convection section.

In accordance with again an added feature of the invention, the compensators required in conventional reactors are eliminated due to the fact that all of the walls in the basic reactor unit are constructed as diaphragm walls with pipes carrying boiling water, resulting in the prevention of impermissible thermal stresses.

In accordance with a concomitant feature of the invention, the separating chamber is provided in conjunction with a combustion chamber for a circulating fluidized-bed furnace. Due to the compact construction, the solid particles, precipitated from the exhaust gas flow, in the region of the floor of the separating chamber can be redirected into the combustion chamber over a short path through a return opening.

Other features which are considered as characteristic for the invention are set forth in the appended claims.

Although the invention is illustrated and described herein as embodied in a separating device for precipitating solid particles from a gas flow of a fluidized bed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, side-sectional view of a reactor block showing a combustion chamber and a separating chamber;

FIG. 5 is a sectional view taken along the line V—V of FIG. 1 in the direction of the arrows.

DESCRIPTION OF THE PREFERRED EMBODIMENTS

Figure 2:
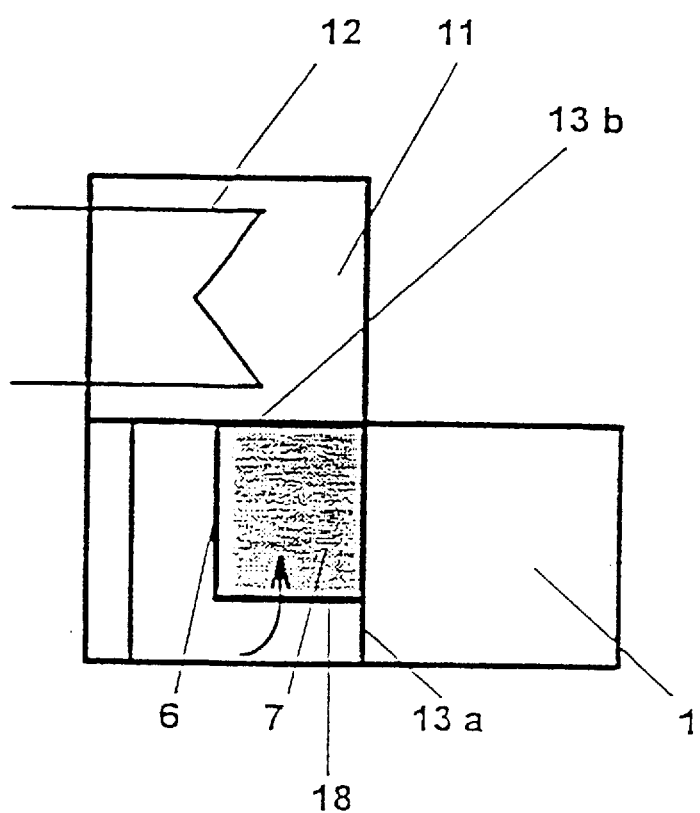
FIG. 2 is a sectional view taken along a line II—II of FIG. 1, in the direction of the arrows.
Figure 3:
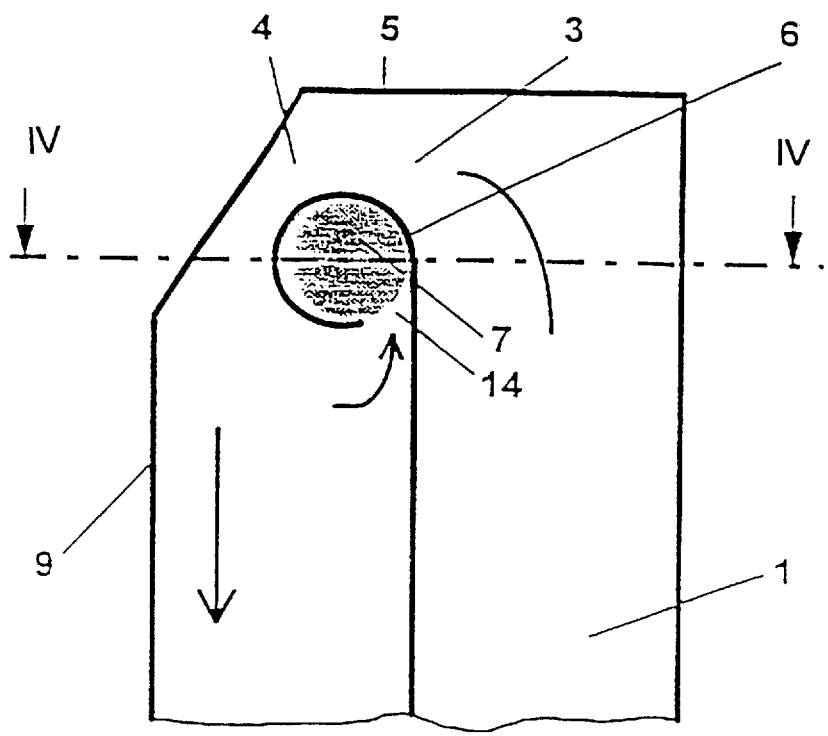
FIG. 3 is a fragmentary view of a portion of a reactor block according to FIG. 1, having a modified take-over channel.
Figure 4:
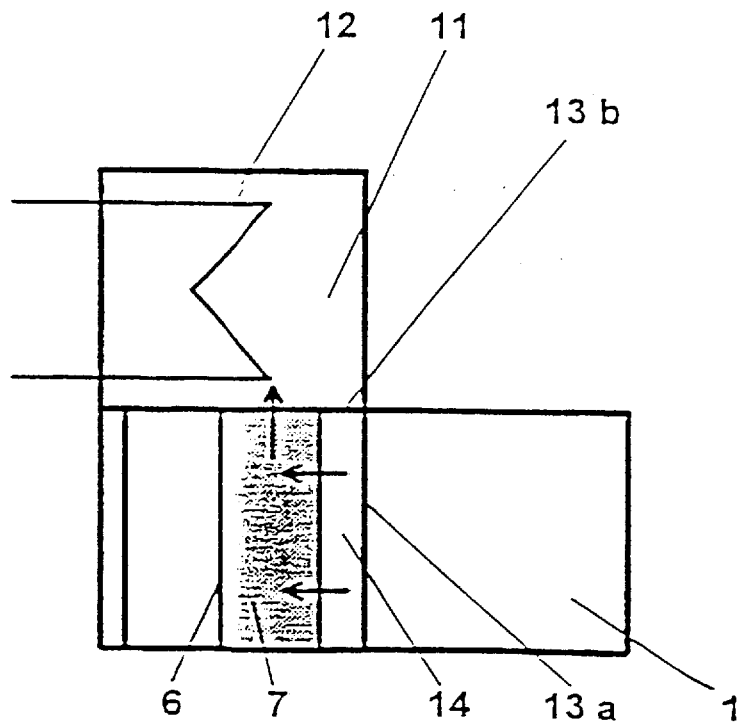
FIG. 4 is a sectional view taken along a line IV—IV of FIG. 3, in the direction of the arrows.

Referring now in detail to FIGS. 1–4 of the drawings as a whole, there are seen greatly simplified views of a circulating fluidized-bed (CFB) reactor or combustion chamber 1, a separating chamber 15 and a convection section 11 which are integrated in a basic reactor unit. A granular solid is introduced into the reactor 1 and swirled by adding primary air 2, and a desired reaction takes place. Since a speed of a gas flow in the combustion chamber 1 is higher than a sinking speed of the solid particles, a portion of the solid particles is entrained and discharged from the CFB reactor 1 by the gas flow.

The gas flow directly downstream of the combustion chamber 1 reaches an inlet opening 3 of a flow channel 4 which is formed by an inside surface of an outer wall 5 and an outside surface of a wall 6 of a take-over channel 7. The flow channel 4 increasingly narrows in the flow direction which generates a continuous acceleration of the gas flow that reaches its highest value at a narrowest point 8 with a cross-sectional area x. The area x is selected in such a way that a flow rate in this case is between 10 and 60 m/s.

The flow channel 4 opens towards the separating chamber 15 downstream of the narrowest point 8 which also represents an inlet 8 into the separating chamber 15. A diffusor effect generated by an expansion in cross-section delays the gas flow, which is simultaneously diverted along an arc 17. In this process, the gas and the solids are separated since the solid particles which are larger than a separating grain of the cyclone-type configuration cannot follow the deflection due to their inertia. Back-mixing such as can occur in conventional cyclones is prevented by this configuration. The solids sliding down on an outer wall 9 of the separating chamber 15 can no longer be caught by the gas flow. The solid particles thus pass to a return opening 10 in a floor region of the separating chamber 15 and are fed again from there to the CFB reactor 1. Since the CFB reactor 1 must be sealed with respect to the separating chamber 15, it is possible, for example, to operate with a non-illustrated cyclone installed in the floor of the separating chamber.

The gaseous component of the gas flow and the solid particles which are smaller than the separating grain leave the separating chamber 15 through the horizontal take-over channel 7 and thus pass into the convection section 11 of the system. The cleaned gas flow emits heat in the convection section 11 to a heat exchanger 12. As is illustrated, in particular, in FIGS. 2 and 4, two variants are conceivable for configuring a feed opening 14, 18 in the take-over channel 7. In the variants according to FIGS. 1 and 2, the tubular take-over channel 7, which is disposed coaxially with a cyclone axis 16, terminates in front of a vertical outer wall of the separating chamber 15 and forms its feed opening 18 in this case. The opening surface can extend vertically in this case, or else it can be angled off and can form a funnel with the outer wall. The funnel opens towards the separating chamber. In the example according to FIGS. 3 and 4, the feed opening is formed by a cutout which extends horizontally along the lateral surface of the take-over channel 7, preferably directly adjoining a partition 13a of the CFB reactor 1. A further partition 13b is disposed between the separating chamber 15 and the convection section 11.

The walls of the separating chamber 15, of the CFB reactor 1, of the convection part 11 and of the connecting partitions 13a, 13b are constructed as diaphragm walls 20 carrying boiling water as shown in FIG. 5. As a result, impermissible thermal stresses are prevented and expensive compensators are no longer required. Thick masonry is not necessary, because the solid particles do not impinge on the walls with the high energy that is usual in cyclones. It is only in regions at risk of erosion that there is a cladding with a thin anti-wear coating. The start-up time of the boiler system is thereby markedly shortened and the structure becomes lighter and less expensive.

We claim:

1. A separating device for precipitating solid particles from a gas flow, comprising:
    a circulating fluidized-bed reactor conducting a gas flow carrying solid particles with a given entraining force; and
    a device for influencing the gas flow to permit centrifugal and gravitational forces greater than said given entraining force to act on the solid particles and cause the solid particles of a specific minimum size to be separated from the gas flow, said device including:
        a flow channel directing from top to bottom the gas flow emerging from said reactor along a circular arc around a horizontally disposed cyclone axis, the gas flow experiencing the centrifugal and gravitational forces as the gas flow traverses said circular arc for separating the solid particles of the specific minimum size from the gas flow;
        a take-over channel disposed next to said flow channel for receiving and passing on the gas flow cleaned of the separated solid particles from said flow channel; and
        a separating chamber into which said flow channel merges vertically and expands downwardly for sinking precipitated separated solid particles into said separating chamber.

2. The separating device according to claim 1, wherein said separating chamber has an inlet, and said flow channel tapers continuously up to said inlet for achieving a continuous acceleration of the gas flow and beyond said inlet acts as a diffusor.

3. The separating device according to claim 2, wherein said flow channel beyond said inlet acting as said diffusor deflects the gas flow for preventing back-mixing with the already separated solid particles.

4. The separating device according to claim 1, wherein said take-over channel has an inlet, and the gas flow circulates around the horizontally disposed cyclone axis up to said inlet and describes the circular arc corresponding to a rotation of less than 360°.

5. The separating device according to claim 1, wherein said take-over channel is disposed coaxially with the cyclone axis inside the circular arc.

6. The separating device according to claim 1, wherein said take-over channel has a receiving opening extending parallel to the cyclone axis with a bottom facing said separating chamber, for receiving the gas flow cleaned of the separated solid particles.

7. The separating device according to claim 1, wherein said take-over channel has a receiving opening extending vertically relative to the cyclone axis.

8. The separating device according to claim 1, wherein said take-over channel has a receiving opening extending at an angle relative to the cyclone axis.

9. The separating device according to claim 1, wherein said reactor and said separating chamber are combined with one another in a basic reactor unit, a partition is disposed between said reactor and said separating chamber, and said partition has an upper end adjoined by said take-over channel at a side of said separating chamber.

10. The separating device according to claim 9, wherein said basic reactor unit has an outer wall forming said flow channel together with said take-over channel.

11. The separating device according to claim 9, wherein said separating chamber has an inlet, said flow channel has a narrowest point before said inlet, and the gas flow reaches its highest speed of between 10 and 60 m/s in said flow channel at said narrowest point.

12. The separating device according to claim 9, including a convection section in which the cleaned gas flow emits heat, said take-over channel connecting said separating chamber to said convection section.

13. The separating device according to claim 12, wherein said convection section is integrated into said basic reactor unit, and a further partition is disposed between said separating chamber and said convection section.

14. The separating device according to claim 13, wherein at least one of said partitions in said basic reactor unit is a diaphragm wall carrying boiling water, and said basic reactor unit has further walls at least some of which are incorporated into a water/steam cycle of a boiler.

15. The separating device according to claim 9, wherein said partition in said basic reactor unit is a diaphragm wall carrying boiling water, and said basic reactor unit has further walls at least some of which are incorporated into a water/steam cycle of a boiler.

16. The separating device according to claim 1, wherein said reactor has a chamber for a circulating fluidized bed, said separating chamber has a floor, and the solid particles precipitated from the gas flow pass back into said reactor through a return opening in the vicinity of said floor.

* * * * *

UNITED STATES PATENT AND TRADEMARK OFFICE
CERTIFICATE OF CORRECTION

PATENT NO. : 5,878,892
DATED : March 9, 1999
INVENTOR(S) : Wladyslaw Lewandowski et al.

It is certified that error appears in the above-identified patent and that said Letters Patent is hereby corrected as shown below:

Item [30], should read as follows:
Feb. 8, 1996      [DE]      Germany ................196 04 565.7

Signed and Sealed this

Ninth Day of October, 2001

Attest:

NICHOLAS P. GODICI
*Attesting Officer*      *Acting Director of the United States Patent and Trademark Office*